(12) United States Patent
Ceccaldi et al.

(10) Patent No.: US 11,282,203 B2
(45) Date of Patent: Mar. 22, 2022

(54) METHOD AND SYSTEM FOR IMAGE ANALYSIS

(71) Applicant: Siemens Healthcare GmbH, Erlangen (DE)

(72) Inventors: Pascal Ceccaldi, Princeton, NJ (US); Serkan Cimen, Jersey City, NJ (US); Peter Mountney, London (GB)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/986,515

(22) Filed: Aug. 6, 2020

(65) Prior Publication Data
US 2021/0042930 A1 Feb. 11, 2021

(30) Foreign Application Priority Data
Aug. 8, 2019 (EP) .................................... 19190831

(51) Int. Cl.
| | | |
|---|---|---|
| G06K 9/00 | (2006.01) | |
| G06T 7/10 | (2017.01) | |
| G06T 3/00 | (2006.01) | |
| G06T 7/00 | (2017.01) | |
| G06T 11/60 | (2006.01) | |

(52) U.S. Cl.
CPC ............. *G06T 7/10* (2017.01); *G06T 3/0068* (2013.01); *G06T 7/0012* (2013.01); *G06T 11/60* (2013.01); *G06T 2207/20081* (2013.01); *G06T 2207/20084* (2013.01); *G06T 2207/30048* (2013.01)

(58) Field of Classification Search
CPC ....... G06T 7/10; G06T 3/0068; G06T 7/0012; G06T 11/60; G06T 2207/20081; G06T 2207/20084; G06T 2207/30048; G06T 2207/30168; G06T 7/0002; G06T 7/136; G06T 7/33; G06T 2207/10116; G06N 20/00
USPC ....................................................... 382/128
See application file for complete search history.

(56) References Cited

U.S. PATENT DOCUMENTS

| | | | |
|---|---|---|---|
| 2016/0092748 A1* | 3/2016 | Koktava | G06K 9/6201 |
| | | | 382/128 |
| 2019/0147588 A1* | 5/2019 | Rowley Grant | G06T 5/002 |
| | | | 382/131 |
| 2019/0221313 A1* | 7/2019 | Rim | G06T 7/00 |
| 2019/0347772 A1* | 11/2019 | Zhang | G01R 33/561 |
| 2020/0202527 A1* | 6/2020 | Choi | A61B 6/03 |
| 2020/0304707 A1* | 9/2020 | Williams | G06T 7/80 |
| 2020/0349673 A1* | 11/2020 | Yoo | G06N 3/08 |
| 2021/0012477 A1* | 1/2021 | Israel | G06K 9/036 |
| 2021/0217166 A1* | 7/2021 | Graule | G06T 7/0014 |
| 2021/0233214 A1* | 7/2021 | Liu | G06N 3/08 |

FOREIGN PATENT DOCUMENTS

EP          3483895 A1     5/2019

\* cited by examiner

*Primary Examiner* — Nan D Huynh
(74) *Attorney, Agent, or Firm* — Schiff Hardin LLP

(57) ABSTRACT

Method and system for image registration or image segmentation. The method includes receiving an image which is to be processed by a first machine-learning model to perform, for example, image registration or segmentation, and using a second machine-learning model to determine if the received image is of a quality suitable for the first machine-learning model to act upon.

15 Claims, 4 Drawing Sheets

METHOD AND SYSTEM FOR IMAGE ANALYSIS

FIELD OF DISCLOSURE

The present disclosure relates to a method and system for analysing images, for example analysing medical images. In particular, the present disclosure relates to methods for analysing images to determine the suitability of an image for a trained machine-learning model.

BACKGROUND

Cardiac interventions are commonly performed under X-ray fluoroscopy guidance. However, X-ray imaging has some limitations in terms of soft tissue visualisation. Pre-operative images or models extracted from those images may be fused with X-ray images to provide supplementary information. The fusion of information may be achieved using image registration methods, which transform different sets of data (that may have been collected using different techniques, or at different times or from different perspectives) into one coordinate system. However, registration of different image modalities (e.g. magnetic resonance imaging, ultrasound, etc.) is difficult due to a number of factors, such as different dimensions of the images (2D or 3D), different intensities or different fields of view.

Despite improvements in this area, registration algorithms can fail when there is an abnormality in the images, such as image artefacts. This is especially problematic for machine-learning based registration algorithms because the algorithms learn how to register images from a set of training images but a real image to be analysed which has one or more abnormalities may be significantly different to the training images. In such cases, also called failure scenarios, it is important to warn a user about the unreliability of the output of the registration algorithm.

Similarly, image segmentation is a process of partitioning an image into multiple segments or sets of pixels, in order to produce segments of the larger image that are more meaningful and easier to analyse. However, a machine-learning based segmentation algorithm may also fail for the same reasons.

Therefore, there is a desire to provide a method and system for performing image analysis to determine the suitability of an image for a machine-learning model, such as those used for image registration and/or image segmentation.

SUMMARY

To address these problems, the present techniques provide a method for processing an image. The method comprises receiving an image to be processed by a first machine-learning model and a second machine-learning model, the image comprising metadata; estimating, using the second machine-learning model, physical information from the received image; extracting, using the second machine-learning model, physical information from the metadata of the received image; determining whether differences between the estimated physical information and the extracted physical information are below a threshold; and applying, when the differences between the estimated physical information and the extracted physical information are below a threshold, the first machine-learning model to the received image.

Each machine-learning model may comprise a neural network capable of learning from training data. The neural network may be a deep neural network for deep learning. Deep neural networks may comprise convolutional, recurrent and/or fully connected layers. Whichever type of network is present, the machine-learning may be supervised, semi-supervised or unsupervised and the training data may be unstructured or unlabelled.

The first machine-learning model may be termed a main task model because it is the task that is performed on the input image. That is, the first machine-learning model performs image registration or image segmentation. As mentioned above, such models may produce an unreliable or incorrect output if they act on image data that contains anomalies and are not aware that the anomalies exist. Accordingly, usage of machine-learning models in certain fields (e.g. medicine) where reliability is important, can be limited if the models do not take into account, or otherwise deal with, anomalies in the image data.

The second machine-learning model may be termed an auxiliary task model because it is the task that determines whether the main task model could be applied to an image in order to successfully and reliably perform image registration or image segmentation. The second machine-learning model therefore analyses an image before the image is acted on by the first machine-learning model, so that the first machine-learning model only acts on images that are likely to result in a reliable registration or segmentation output. In other words, the second machine-learning model checks the quality of the data to be processed by the first machine-learning model.

An image may be stored with corresponding metadata that contains information on, among other things, the physical parameters associated with how the image was captured. The first machine-learning model and the second machine-learning model may have been trained on the same training data. In this way, if the second machine-learning model can reliably estimate the physical parameters from an image, then the image is considered to be a high quality image for the first machine-learning model.

The method may further comprise obtaining, using the first machine-learning model, image features from the received image. The image features may be obtained or extracted by an encoder or by one or more convolutional layers of the first machine-learning model. The step of estimating physical information (using the second machine-learning model) from the received image may comprise using the obtained image features to estimate the physical information. Thus, when both the first and second machine-learning models have been trained on the same data, the second machine-learning model understands the image features that have been obtained by the encoder of the first machine-learning model.

The threshold may depend on which imaging technique is used to acquire the image, e.g. magnetic resonance imaging (MRI), X-ray, X-ray fluoroscopy, ultrasound, computerised tomography (CT), etc.

When the differences between the estimated physical information and the extracted physical information exceed the threshold, the method may comprise outputting data indicating that the received image is not suitable for the first machine-learning model to analyse. Thus, the second machine-learning model may output data that warns a user that any analysis performed by the first machine-learning model on the same image is likely to be unreliable. In some cases, the output data may be a message on a user interface which indicates to the user that the image should not be operated on by the first machine-learning model (or that the results of the operation should be disregarded as unreliable).

Alternatively, outputting data may comprise outputting a modified image which is a version of the received image that is modified to indicate at least one abnormality in the received image which caused the differences to exceed the threshold. That is, the output may be a modified version of the received, input image which has been modified to show each abnormality in the input image which would cause the segmentation or registration algorithm output to be unreliable. This type of feedback may enable a user to capture another image which avoids the or each abnormality. For example, if the image is of a heart, and the abnormality was caused by a guidewire or a pace maker being in the way of some or all of the heart, then modified image may highlight this guidewire/pace maker in order that the surgeon or medical practitioner may try to obtain another image of the heart from an angle that avoids the guidewire/pacemaker. This may enable an image of higher quality to be captured, which would be suitable for the registration or segmentation process performed by the first machine-learning model.

The modified image may comprise a heatmap to indicate a probability of the at least one abnormality in the received image causing the differences to exceed the threshold. The entire modified image may be coloured according to the heatmap, or only the abnormalities may be coloured according to the heatmap. For example, in the modified image objects or features coloured blue may be associated with a low probability of causing the original image to result in a 'failure' (i.e. for the registration/segmentation to be unreliable), while objects or features coloured red may be associated with a high probability of causing the original image to result in a 'failure'. In this way, a surgeon or other user may be able to quickly determine the cause of the low quality image and determine a solution.

The at least one abnormality may be any one or more of an image artefact, a pathology, a guide wire, and a pace maker.

As mentioned above, the second machine-learning model checks the quality of the data for the first machine-learning model by trying to estimate the physical information used to capture the image using features extracted from the image. The metadata associated with the image contains the physical information, and therefore, the second machine-learning model compares the estimated physical information to the actual physical information contained within the metadata. The extracted physical information (i.e. the physical information extracted from the metadata), and therefore the estimated physical information (estimated by the second machine-learning model) may comprise any one or more of: an imaging device used to acquire the received image (e.g. MRI machine, CT scanner, ultrasound, X-ray, etc.), an operating parameter associated with the imaging device (e.g. X-ray tube current, peak voltage, etc.), an angle of the imaging device relative to an object being imaged, and a distance of the imaging device from an object being imaged. Thus, if the second machine-learning model can accurately (within a specified tolerance) determine how the image was captured, then any abnormalities in the image may be considered to have little impact on the reliability of any subsequent registration or segmentation process. If the second machine-learning model cannot determine how the image was captured, then any abnormalities in the image are significant enough to negatively affect the processing performed by the first machine-learning model.

As already mentioned, the first machine-learning model may be applied to the received image to perform image registration or image segmentation.

The received image may be any one of an X-ray image, a magnetic resonance image, an ultrasound image, and a computerised tomography scan.

The first machine-learning model and/or the second machine-learning model may comprise a convolutional neural network.

The present techniques also provide a (non-transitory) computer readable medium carrying processor control code which when implemented in a system (e.g. an image processor) causes the system to carry out the methods described herein.

The present techniques also provide an image processing system for processing an image. The system may comprise an image processor which is configured to carry out the methods described herein. The system may also comprise an image capture device which is configured to capture an image, and this is the input image which may be received by the image processor. The system may also comprise a user interface which is configured to display an output result generated by the image processor.

BRIEF DESCRIPTION OF THE DRAWINGS

The above mentioned attributes and other features and advantages of this disclosure and the manner of attaining them will become more apparent and the disclosure itself will be better understood by reference to the following description of embodiments of the disclosure taken in conjunction with the accompanying drawings, wherein.

DETAILED DESCRIPTION

Figure 1:
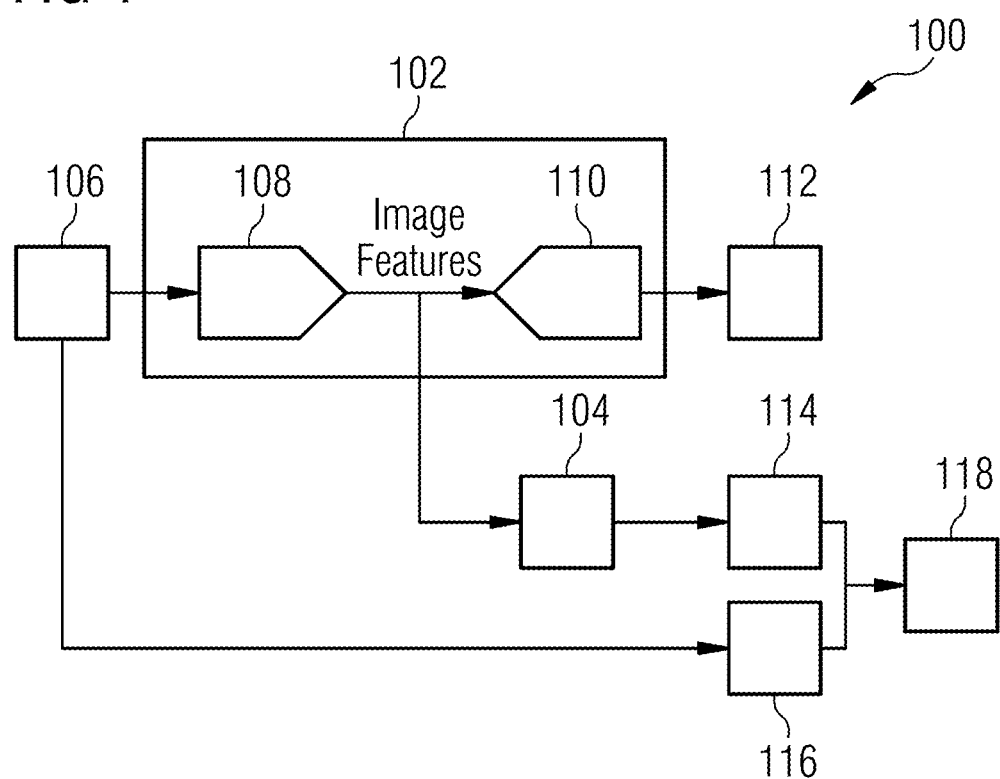
FIG. 1 shows a schematic block diagram of a system to implement the methods described herein.

FIG. 1 shows a schematic block diagram of a system 100 to analyse or process an image, e.g. a medical image. The system 100 comprises a first machine-learning model 102 and a second machine-learning model 104. The first machine-learning model 102 may comprise an encoder or autoencoder 108. The encoder 108 may be a type of neural network which analyses an input image and outputs a feature map or feature vector (i.e. image features). The first machine-learning model 102 may comprise a decoder 110. The decoder 110 is typically trained with the encoder, but acts on the feature map/vector produced by the encoder and tries to produce an output that best matches the original image or some intended output. The first machine-learning model 102 acts on an input image 106, which may be a medical image (e.g. X-ray) and produces an output 112, which may be a segmentation or registration of the input image.

The second machine-learning model 104 also operates on the received image 106. However, to keep the second machine-learning model relatively simple, the second machine-learning model 104 operates on the image features obtained by the encoder or convolutional layer(s) of the first machine-learning model 102. This also ensures that the estimations performed by the second machine-learning model 108 are performed using the same image features that would be used by the first machine-learning model 102 to produce output 112 without any significant modification. Thus, this system architecture advantageously ensures that the first and second machine-learning models 102 and 104 operate on the same information and share information.

In some cases, it may be possible to train the first machine-learning model 102 and the second machine-learning model 104 on different training data.

The second machine-learning model 104 outputs an estimate of the physical information 114 associated with the received image 106. The system 100 compares the estimate of the physical information 114 with extracted physical information 116 (which is extracted from metadata associated with/stored with the received image 106), and generates an output 118. If the differences between the estimated physical information and the extracted physical information are below a threshold (which may depend on the imaging technique used to acquire the image), then the received image may be considered a high quality image. In this case, the output 118 may be instructions to the first machine-learning model 104 to continue processing the image 106 because the output 112 of the processing is likely to be reliable. If the differences between the estimated physical information and the extracted physical information are above a threshold, then the received image may be considered a low quality image. In this case, the output 118 may be data presented on a user interface that indicates that the received image is not suitable for the first machine-learning model to analyse.

For example, the output data may be a message on a user interface that indicates to the user that the image 106 should not be operated on by the first machine-learning model 102 (or that the output 112 of the model 102 should be disregarded as unreliable).

Alternatively, the output 118 may be a modified image which is a version of the received image 106 that is modified to indicate at least one abnormality in the received image 106 which caused the differences to exceed the threshold. That is, the output 118 of comparing the estimated and extracted physical information may be a modified version of the received input image 106 which has been modified to show each abnormality in the input image 106 which would cause the segmentation or registration algorithm output of the first machine-learning model 102 to be unreliable. This type of feedback may enable a user to capture another image which avoids the or each abnormality. For example, if the image is of a heart, and the abnormality was caused by a guidewire or a pace maker being in the way of some or all of the heart, then modified image may highlight this guidewire/pace maker in order that the surgeon or medical practitioner may try to obtain another image of the heart from an angle that avoids the guidewire/pacemaker. This may enable an image of higher quality to be captured, which would be suitable for the registration or segmentation process performed by the first machine-learning model.

Figure 4A:
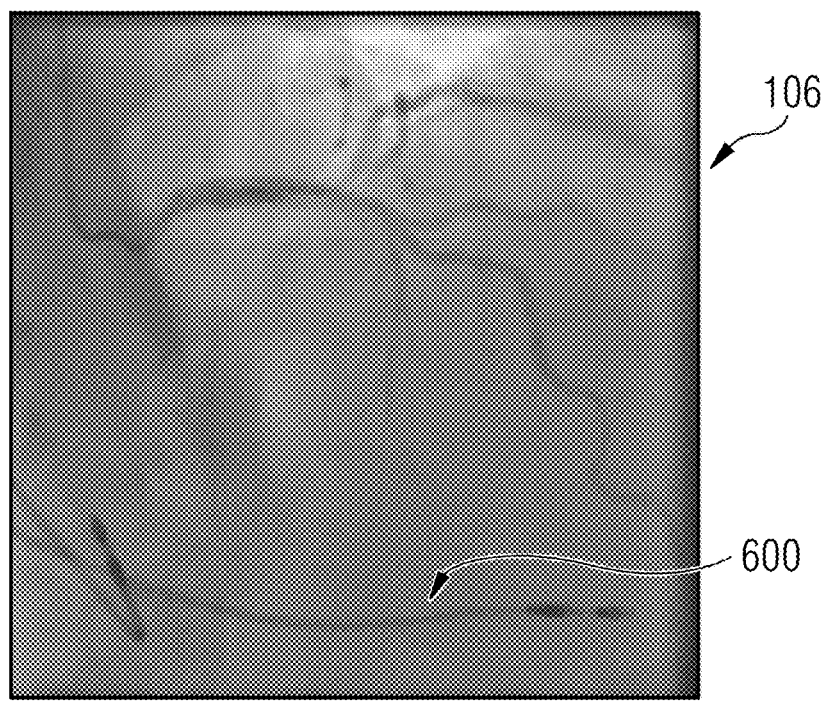
FIG. 4A shows an example image to be processed.
Figure 4B:
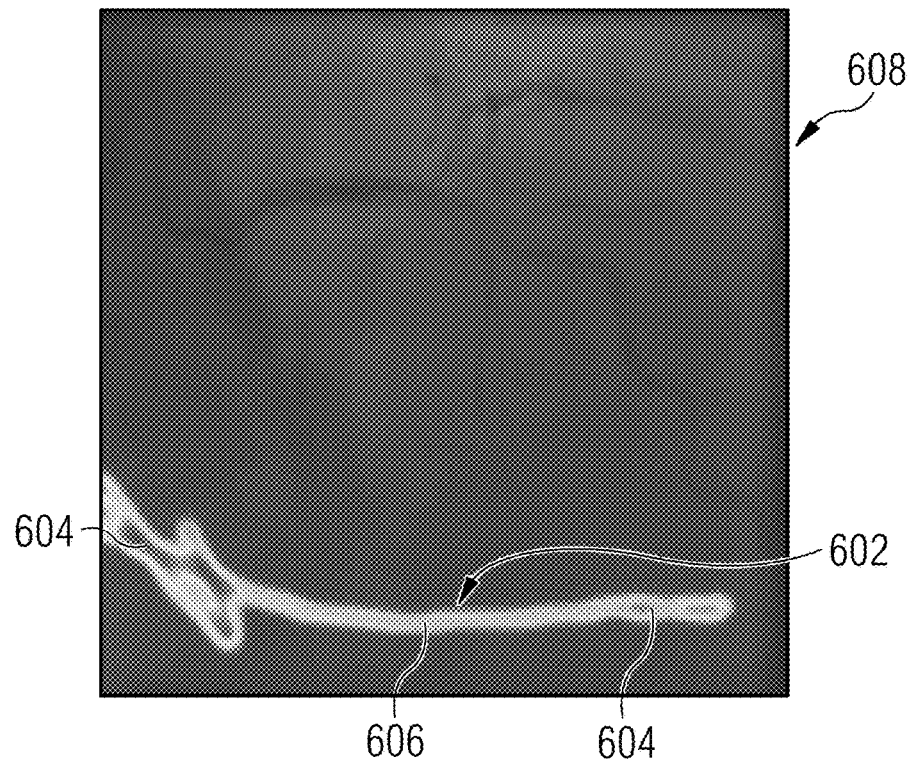
FIG. 4B shows an example output of the methods described herein indicating the suitability of the image.

The modified image may comprise a heatmap to indicate a probability of the at least one abnormality in the received image 106 causing the differences to exceed the threshold. The entire modified image may be coloured according to the heatmap, or only the abnormalities may be coloured according to the heatmap. For example, in the modified image objects or features coloured blue may be associated with a low probability of causing the original image to result in a 'failure' (i.e. for the registration/segmentation to be unreliable), while objects or features coloured red may be associated with a high probability of causing the original image to result in a 'failure'. FIG. 4A shows an example received image 106 that is received by system 100 for processing. Part of the example received image 106 is obscured by a guide wire 600. FIG. 4B shows an example output of the methods described herein indicating the suitability of the image. Specifically, FIG. 4B shows a modified image 608 which is a version of the received image 106 that has been modified to indicate at least one abnormality (e.g. the guide wire 600) in the received image 106 that caused the differences to exceed the threshold. In this example, the guide wire 600 is the only abnormality. The modified image 608 comprises a heatmap 602 which indicates a probability of the abnormality causing the differences to exceed the threshold. From the heatmap 602, it is clear that some parts 604 of the abnormality/guide wire are associated with a high probability of causing the original image to result in a 'failure', while another part 606 is associated with a low probability of causing the original image to result in a 'failure'. In this way, a surgeon or other user may be able to quickly determine from the modified image 608 the cause of the low quality image and determine a solution (e.g. move the imaging apparatus to a different position or angle).

The system 100 may comprise a convolutional neural network (CNN) with an embedded attention mechanism (not shown) to help indicate to a user the abnormalities or potential causes of the low quality image, so that the user may capture another image without a similar problem. The CNN may use encoded image features and the output data indicating that the received image is not suitable for the first machine-learning model to analyse to provide the user with an indication of the potential causes of the low quality image. For example, the CNN may be used to generate the modified image comprising a heatmap, as described above, where the CNN uses the attention mechanism to generate the heatmap (i.e. an attention map).

Figure 2:
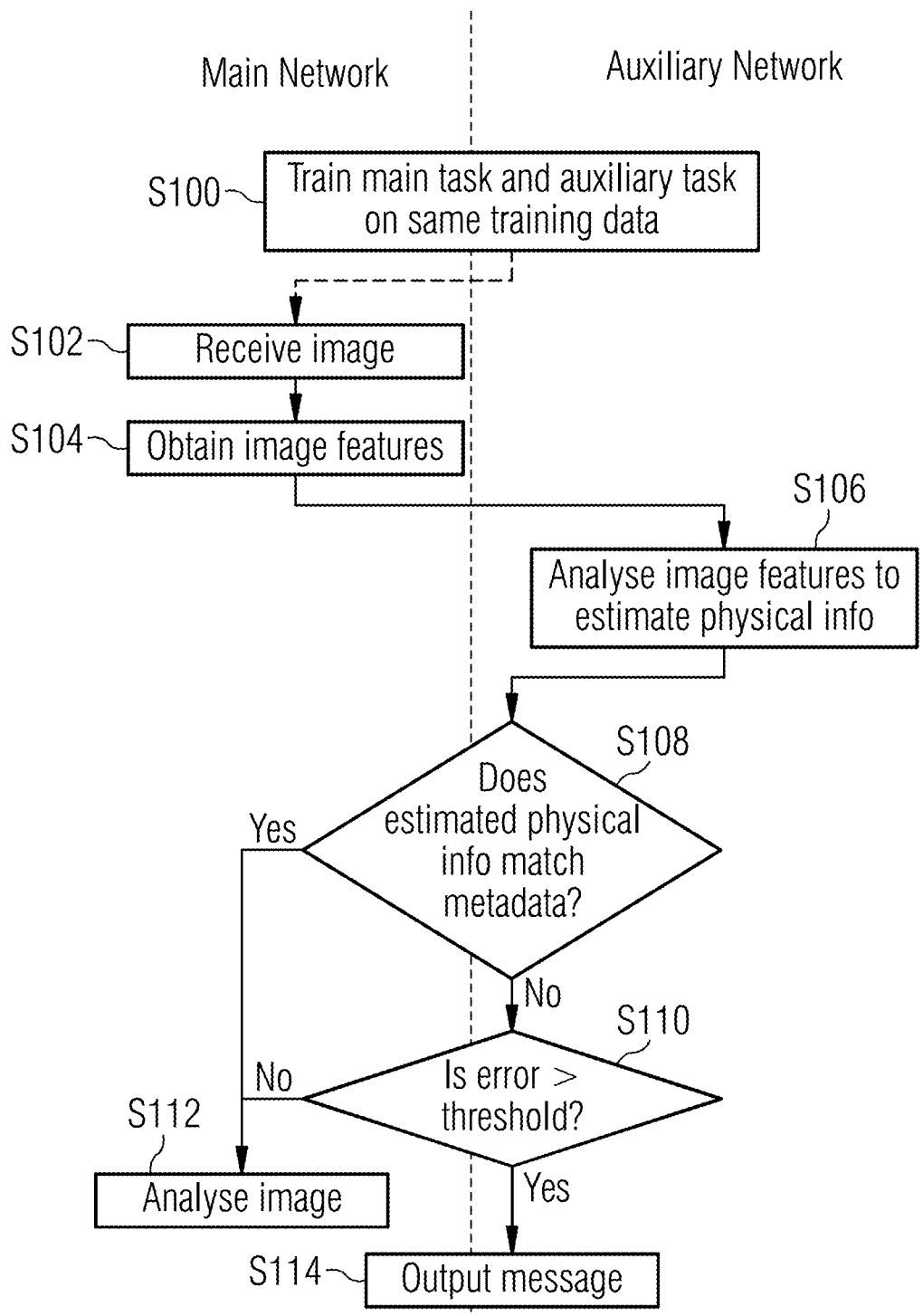
FIG. 2 shows a flow chart showing example steps to process an image using the system of FIG. 1.

FIG. 2 shows a flow chart showing example steps to process an image using the system 100 of FIG. 1. The dashed line is used to indicate which steps are performed by the main network/first machine-learning model 102, which steps are performed by the auxiliary network/second machine-learning model 104 of the system 100, and which steps are performed by other components of the system 100. As shown in FIG. 2, both the main network and the auxiliary network are trained on the same training data (step S100). The training data may be a set of medical images (e.g. X-ray images, MRI images, or images obtained via different imaging techniques) which are considered to be abnormality-free. The images are stored with or associated with metadata that comprises physical information. As mentioned above, the physical information may comprise any one or more of an imaging device used to acquire the received image, an operating parameter associated with the imaging device, an angle of the imaging device relative to an object being imaged, and a distance of the imaging device from an object being imaged. The first and second machine-learning models 102, 104 are jointly trained using this training data using any suitable training techniques (e.g. backpropagation and gradient descent algorithms).

When an image is received by system 100 (step S102), the first machine-learning model 102 (e.g. using encoder 108) analyses the received image 106 to obtain image features (step S104). Before the first machine-learning model 102 performs its main task (e.g. image segmentation or image registration), the second machine-learning model 104 is used to estimate the physical information from the received image. Specifically, the second machine-learning model 104 analyses the image features obtained by the first machine-learning model 102 to estimate the physical information (step S106).

System 100 then compares the estimated physical information with the physical information extracted from the metadata associated with the received image (step S108), to determine whether the estimated and extracted physical information match. If yes, then the process continues to step S112 and the first machine-learning model operates on the received image to perform the main task (e.g. segmentation/registration). The result of the comparison in this case may be instructions to the first machine-learning model to use the image features extracted by the encoder to perform the main task.

If at step S108 the estimated physical information and the extracted physical information are determined not to match, then the system 100 may check if any differences (or errors) between the two sets of physical information are within some permitted value (step S110). In other words, at step S110, the system determines whether the differences between the estimated physical information and the extracted physical information are equal to or below a threshold. If the differences exceed the threshold, then the system may output data indicating that the received image is not suitable for the first machine-learning model to analyse (step S114). If the differences are equal to or below the threshold, then the method may proceed to step S112. Thus, if the estimation error is above a pre-determined threshold, then the received image may be considered unsuitable for the subsequent processing by the first machine-learning model.

Advantageously, this method links the quality of the image to the processing that is to be performed using the image/on the image. This means that the quality assessment is made in the context of the task performed by the first machine-learning model (e.g. segmentation or registration). This is useful because different tasks may be able to accept different image qualities.

Further advantageously, the method overcomes problems associated with existing techniques for assessing the quality of a medical image, which typically seek a probability distribution of training images, and check if a received image is compatible with the training distribution. These methods often assign low confidence values to images that are of a high quality but are not compatible with the distribution. The present techniques use metadata to assess the quality of the image such that if the second machine-learning model is able to estimate the physical information in the metadata correctly, the image is considered to be high quality even if the appearance of the image is different to the images in the training data.

Figure 3:
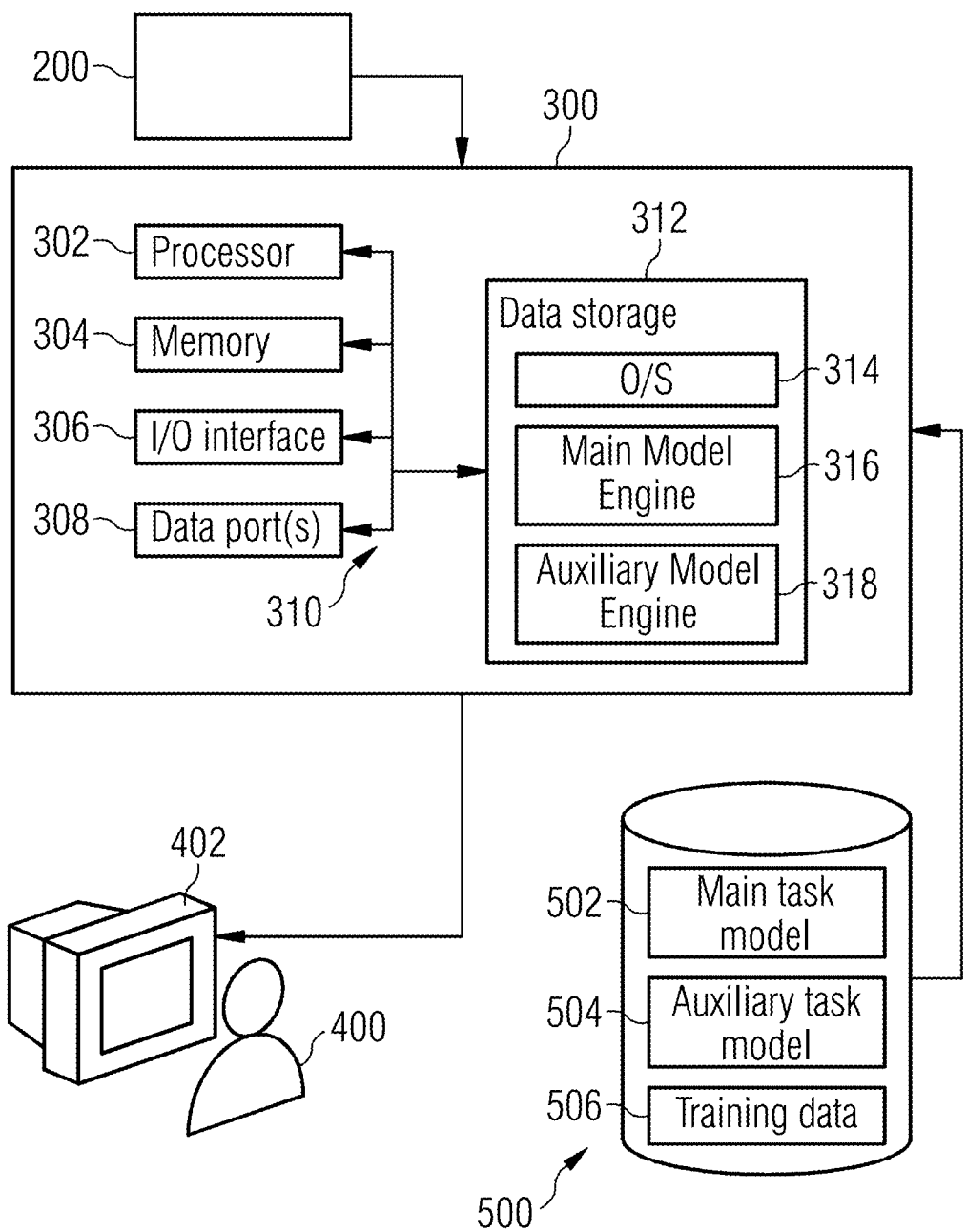
FIG. 3 is a block diagram of components which may be used to carry out the methods described herein.

FIG. 3 is a block diagram of components of an image processing system which may be used to carry out the methods described herein. The system comprises an image processor 300 which may perform the method of FIG. 2. An imaging system 200, e.g. an X-ray machine, an MRI scanner or the like, captures an image which is sent to the image processor 300. The outputs from the image processing, e.g. the output data that indicates the captured image is not suitable for the first machine-learning model to analyse, or the results of the first machine-learning model may be output to a user 400 via any suitable user interface 402, e.g. a screen on a computer or other electronic device. The image processor 300 may also be connected to a database 500, which stores for example the training data 506 which is used to train the models (i.e. the main task model 502 and the auxiliary task mode 504).

The image processor 300 may be formed from one or more servers and the steps (or tasks) in FIG. 2 may be split across the one or more servers or the cloud. The image processor 300 may include one or more processors 302, one or more memory devices 304 (generically referred to herein as memory 304), one or more input/output ("I/O") interface(s) 306, one or more data ports 308, and data storage 312. The image processor 300 may further include one or more buses 310 that functionally couple various components of the image processor 300.

The data storage 312 may store one or more operating systems (O/S) 314; and one or more program modules, applications, engines, computer-executable code, scripts, or the like such as, for example, a main model engine 316 and an auxiliary model engine 318. The main model engine 316 may perform steps S104 and S112 of FIG. 2, and auxiliary model engine 318 may perform step S106 of FIG. 2, for example. Any of the components depicted as being stored in data storage 312 may include any combination of software, firmware, and/or hardware. The software and/or firmware may include computer-executable code, instructions, or the like that may be loaded into the memory 304 for execution by one or more of the processor(s) 302 to perform any of the operations described earlier in connection with correspondingly named engines.

The bus(es) 310 may include at least one of a system bus, a memory bus, an address bus, or a message bus, and may permit exchange of information (e.g., data (including computer-executable code), signalling, etc.) between various components of the image processor 300. The bus(es) 310 may include, without limitation, a memory bus or a memory controller, a peripheral bus, an accelerated graphics port, and so forth. The bus(es) 310 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 304 of the image processor 300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 312 and/or the database 500 may include removable storage and/or non-removable storage including, but not limited to, magnetic storage, optical disk storage, and/or tape storage. The data storage 312 and/or the database 500 may provide non-volatile storage of computer-executable instructions and other data. The memory 304, the database 500 and the data storage 312, removable and/or non-removable, are examples of computer-readable storage media (CRSM).

The data storage 312 may store computer-executable code, instructions, or the like that may be loadable into the memory 304 and executable by the processor(s) 302 to cause the processor(s) 302 to perform or initiate various operations. The data storage 312 may additionally store data that may be copied to memory 304 for use by the processor(s) 302 during the execution of the computer-executable instructions. Moreover, output data generated as a result of execution of the computer-executable instructions by the processor(s) 302 may be stored initially in memory 304, and may ultimately be copied to data storage 312 for non-volatile storage.

The data storage 312 may further store various types of data utilized by components of the image processor 300. Any data stored in the data storage 312 may be loaded into the memory 304 for use by the processor(s) 302 in executing computer-executable code. In addition, any data depicted as being stored in the data storage 312 may potentially be stored in one or more of the datastores and may be accessed and loaded in the memory 304 for use by the processor(s) 302 in executing computer-executable code.

The processor(s) 302 may be configured to access the memory 304 and execute computer-executable instructions loaded therein. For example, the processor(s) 302 may be configured to execute computer-executable instructions of the various program modules, applications, engines, or the like of the system to cause or facilitate various operations to be performed in accordance with one or more embodiments of the disclosure. The processor(s) 302 may include any suitable processing unit capable of accepting data as input, processing the input data in accordance with stored computer-executable instructions, and generating output data. The processor(s) 302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 302 may be capable of supporting any of a variety of instruction sets.

Referring now to other illustrative components depicted as being stored in the data storage 312, the O/S 314 may be loaded from the data storage 312 into the memory 304 and may provide an interface between other application software executing on the image processor 300 and hardware resources of the image processor 300. More specifically, the O/S 314 may include a set of computer-executable instructions for managing hardware resources of the system and for providing common services to other application programs (e.g., managing memory allocation among various application programs). In certain example embodiments, the O/S 314 may control execution of one or more of the program modules depicted as being stored in the data storage 312. The O/S 314 may include any operating system now known or which may be developed in the future including, but not limited to, any server operating system, any mainframe operating system, or any other proprietary or non-proprietary operating system.

Referring now to other illustrative components of the image processor 300, the input/output (I/O) interface(s) 306 may facilitate the receipt of input information by the image processor 300 from one or more I/O devices as well as the output of information from the image processor 300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the image processor 300 or may be separate. The I/O devices may further include, for example, any number of peripheral devices such as data storage devices, printing devices, and so forth.

The I/O interface(s) 306 may also include an interface for an external peripheral device connection such as universal serial bus (USB), FireWire, Thunderbolt, Ethernet port or other connection protocol that may connect to one or more networks. The I/O interface(s) 306 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The image processor 300 may further include one or more data ports 310 via which the image processor 300 may communicate with any of the processing modules. The data ports(s) 310 may enable communication with the image capture device 200 and the database 500.

It should be appreciated that the engines and the program modules depicted in the Figures are merely illustrative and not exhaustive and that processing described as being supported by any particular engine or module may alternatively be distributed across multiple engines, modules, or the like, or performed by a different engine, module, or the like. In addition, various program module(s), script(s), plug-in(s), Application Programming Interface(s) (API(s)), or any other suitable computer-executable code hosted locally on the system and/or hosted on other computing device(s) accessible via one or more of the network(s), may be provided to support the provided functionality, and/or additional or alternate functionality. Further, functionality may be modularized differently such that processing described as being supported collectively by the collection of engines or the collection of program modules may be performed by a fewer or greater number of engines or program modules, or functionality described as being supported by any particular engine or module may be supported, at least in part, by another engine or program module. In addition, engines or program modules that support the functionality described herein may form part of one or more applications executable across any number of devices of the system in accordance with any suitable computing model such as, for example, a client-server model, a peer-to-peer model, and so forth. In addition, any of the functionality described as being supported by any of the engines or program modules may be implemented, at least partially, in hardware and/or firmware across any number of devices.

It should further be appreciated that the system may include alternate and/or additional hardware, software, or firmware components beyond those described or depicted without departing from the scope of the disclosure. More particularly, it should be appreciated that software, firmware, or hardware components depicted as forming part of the system are merely illustrative and that some components may not be present or additional components may be provided in various embodiments. While various illustrative engines have been depicted and described as software engines or program modules, it should be appreciated that functionality described as being supported by the engines or modules may be enabled by any combination of hardware, software, and/or firmware. It should further be appreciated that each of the above-mentioned engines or modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular engine or module may, in various embodiments, be provided at least in part by one or more other engines or modules. Further, one or more depicted engines or modules may not be present in certain embodiments, while in other embodiments, additional engines or modules not depicted may be present and may support at least a portion of the described functionality and/or additional functionality. Moreover, while certain engines modules may be depicted or described as sub-engines or sub-modules of another engine or module, in certain embodiments, such engines or modules may be provided as independent engines or modules or as sub-engines or sub-modules of other engines or modules.

The operations described and depicted in the illustrative methods of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A method for processing an image, the method comprising:
   receiving an image to be processed by a first machine-learning model, wherein the image comprises metadata;
   estimating, using a second machine-learning model, numerical physical information from the received image;
   extracting, using the second machine-learning model, numerical physical information from the metadata of the received image;
   determining whether differences between a value of the estimated numerical physical information and a value of the extracted numerical physical information are below a threshold; and
   applying, when the differences between the value of the estimated numerical physical information and the value of the extracted numerical physical information are below the threshold, the first machine-learning model to the received image.

2. The method as claimed in claim 1, further comprising:
   obtaining, using the first machine-learning model, image features from the received image,
   wherein the step of estimating numerical physical information from the received image comprises using the obtained image features to estimate the numerical physical information.

3. The method as claimed in claim 1, wherein the first machine-learning model and the second machine-learning model have been trained on the same training data.

4. The method as claimed in claim 1, wherein the threshold depends on an imaging technique used to acquire the image.

5. The method as claimed in claim 1, wherein when the differences between the value of the estimated numerical physical information and the value of the extracted numerical physical information exceed the threshold, the method further comprises:
   outputting data indicating that the received image is not suitable for the first machine-learning model to analyze.

6. The method as claimed in claim 5, wherein the step of outputting data comprises outputting a modified image which is a version of the received image that is modified to indicate at least one abnormality in the received image which caused the differences to exceed the threshold.

7. The method as claimed in claim 6, wherein the modified image comprises a heatmap to indicate a probability of the at least one abnormality in the received image causing the differences to exceed the threshold.

8. The method as claimed in claim 6, wherein the at least one abnormality is any one or more of: an image artefact, a pathology, a guide wire, and a pace maker.

9. The method as claimed in claim 1, wherein the estimated numerical physical information and extracted numerical physical information comprises any one or more of: an operating parameter associated with the imaging device, an angle of the imaging device relative to an object being imaged, and a distance of the imaging device from an object being imaged.

10. The method as claimed in claim 1, wherein the first machine-learning model is applied to the received image to perform image registration.

11. The method as claimed in claim 1, wherein the first machine-learning model is applied to the received image to perform image segmentation.

12. The method as claimed in claim 1, wherein the received image is any one of: an X-ray image, a magnetic resonance image, an ultrasound image, and a computerized tomography scan.

13. The method as claimed in claim 1, wherein the first machine-learning model and/or the second machine-learning model comprises a convolutional neural network.

14. A non-transitory computer readable medium having processor control code which, when implemented in a system, causes the system to carry out the method of claim 1.

15. An image processing system, comprising:
- an image capture device which is configured to capture an image;
- an image processor which is configured to receive an image from the image capture device and carry out a method for processing the image, the method comprising:
  - receiving the image by a first machine-learning model, wherein the image comprises metadata;
  - estimating, using a second machine-learning model, numerical physical information from the received image;
  - extracting, using the second machine-learning model, numerical physical information from the metadata of the received image;
  - determining whether differences between a value of the estimated numerical physical information and a value of the extracted numerical physical information are below a threshold; and
  - applying, when the differences between the value of the estimated numerical physical information and the value of the extracted numerical physical information are below the threshold, the first machine-learning model to the received image; and
- a user interface which is configured to display an output result generated by the image processor.

\* \* \* \* \*